April 4, 1939.　　F. M. TALBOT　　2,152,933
CONTAINER HANDLE
Filed June 24, 1937　　2 Sheets-Sheet 1
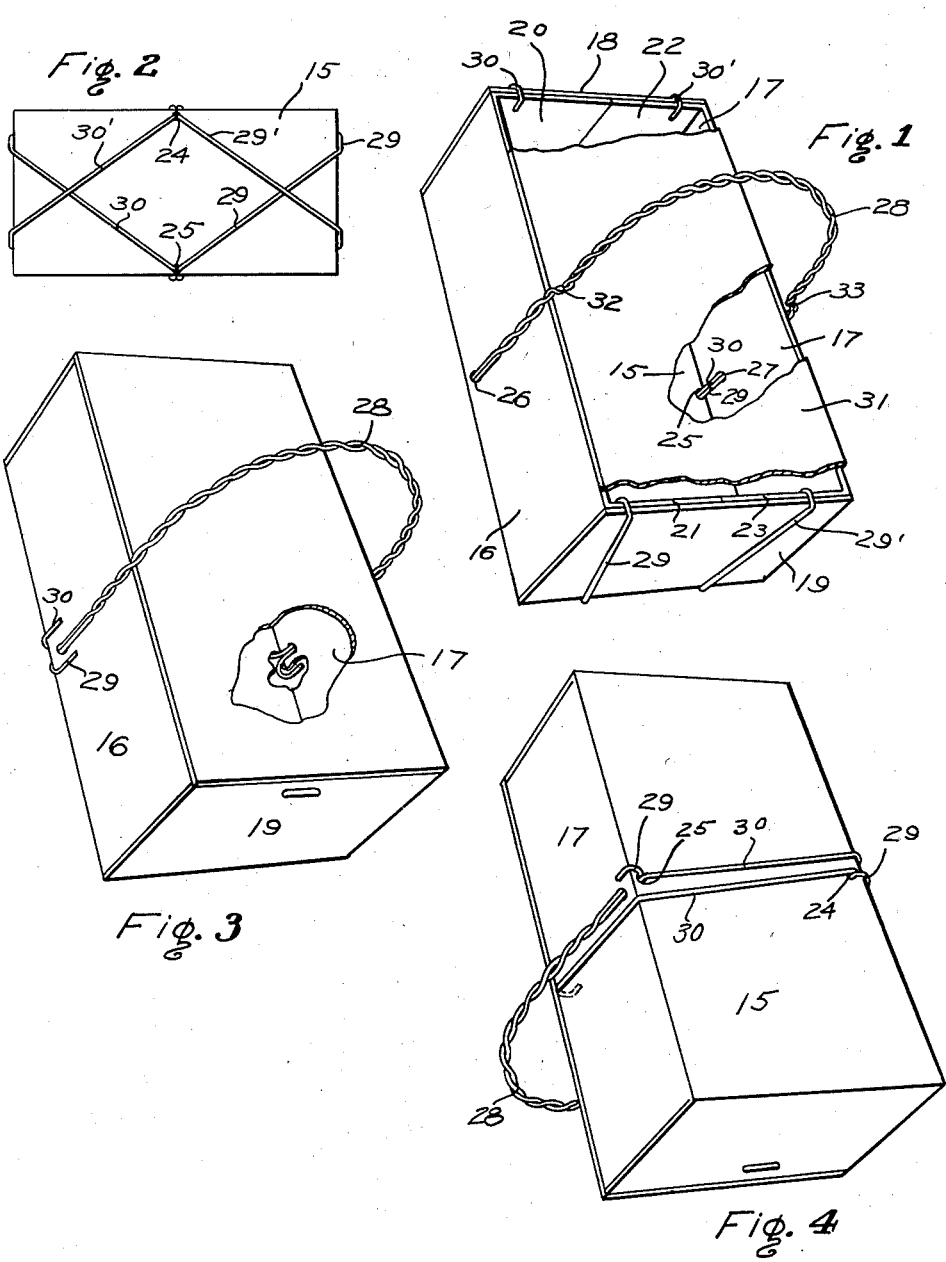
Inventor
F. Merrill Talbot,
By Minturn & Minturn,
Attorneys

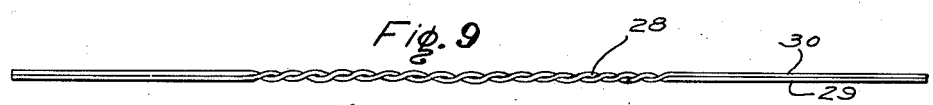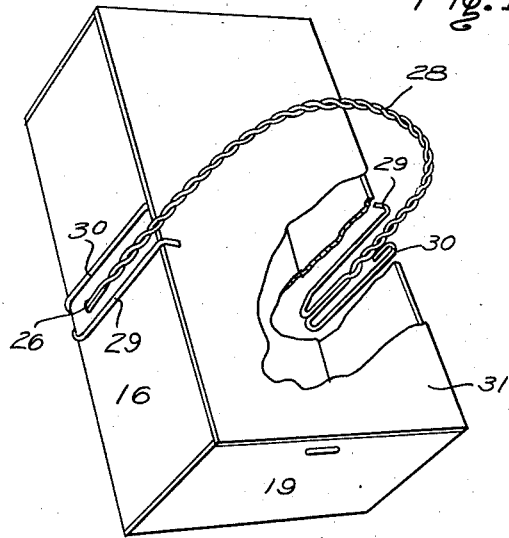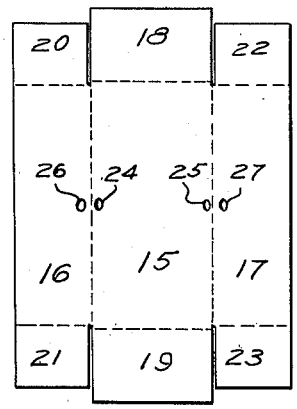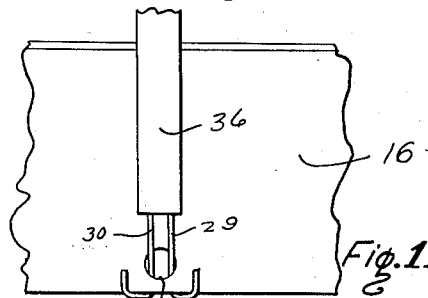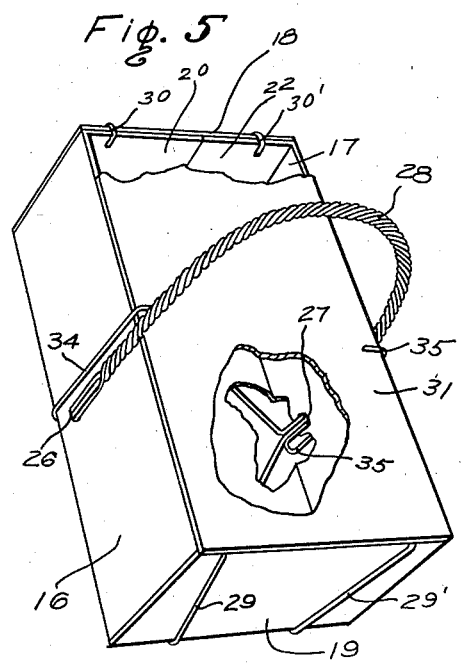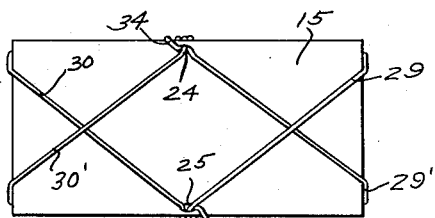

Patented Apr. 4, 1939

2,152,933

UNITED STATES PATENT OFFICE 2,152,933

CONTAINER HANDLE

Frank Merrill Talbot, Bloomington, Ind.

Application June 24, 1937, Serial No. 150,137

12 Claims. (Cl. 229—52)

This invention comprises an unique combination of a handle and a fiber board basket or container wherein the handle is initially in a straight condition and is formed as it is applied to the basket. Many advantages are to be derived from the invention including the reenforcing of the floor of the basket by means of terminal ends of the handle; the securing of the basket in formed shape as folded from a blank by means of terminal ends of the handle without requiring the heretofore used staples; and the cooperation of terminal ends of the handle or other portions of the handle in securing a cover in position over the container.

These and many other objects and advantages such as the extreme simplicity of setting up the basket and attaching the handle thereto and the low cost of not only materials but of the labor in making the assembly, will become apparent to those versed in the art in the following description of the invention as illustrated in the accompanying drawings in which:

Fig. 1 is a top perspective view of a basket embodying the invention,

Fig. 2, a bottom plan view on a reduced scale,

Fig. 3, a top perspective view of a basket embodying a modified form of the invention, Fig. 4, a bottom perspective view of a basket showing a further modified form of handle attachment, Fig. 5, a top perspective view of a basket with a further slightly modified form of handle attachment, Fig. 6, a top perspective view of a basket similar in form of invention to that shown in Fig. 1, Fig. 7, a bottom plan view on reduced scale of that form as shown in Fig. 6, Fig. 8, a top plan view of the basket in blank form before folding to shape, Fig. 9, a plan view of the handle, Fig. 10, a modified form of the handle in plan view, and Fig. 11, a detailed side elevation of a modified handle form.

Like characters of reference indicate like parts throughout the several views in the drawings.

Referring first to Figs. 1, 2, 8, and 9, the blank shown in Fig. 8 having the bottom portion 15, sides 16 and 17, ends 18 and 19, and the respective side end-flaps 20 and 21, foldable from the side 16, and 22, 23, foldable from the side 17, to come respectively within the ends 18 and 19 when the sides 16 and 17 are bent upwardly and the ends 18 and 19 folded upwardly against those flaps. The bottom section 15 of the blank is provided with the holes 24 and 25 punched therethrough adjacent its side marginal edges on a center transverse line. The side 16 is provided with a hole 26 punched therethrough preferably close to the fold line between the side 16 and the bottom section 15. Likewise a hole 27 is punched through the side 17 at the same elevation as the hole 26 above the bottom section 15.

The handle generally designated by the numeral 28, Fig. 9, is preferably formed from a plurality of wires having their central portions twisted together, although it is possible to employ a single wire in the simplest possible form. The handle 28 is applied to the basket by inserting one end thereof inwardly through the side hole 27 and thence downwardly on the inside of the basket through the hole 25. Where the handle 28 is formed from 2 wires, 29 and 30, the one wire 29 is bent sharply from the hole 25 along the under-side of the basket in a diagonal manner to the end 19 and is then bent sharply upwardly along the end 19 to the top edge thereof and is then carried over and down on the inside to engage over the end flap 21. In like manner the other wire 30 is carried diagonally over the bottom section 15 and thence upwardly along the end 18 and turned thereover across the end flap 20 and bent down on the inside to grip that flap 20 against the end 18 to hold it rigidly in position.

The handle 28 is then curved around over the basket to have its other end inserted through the hole 26 from the outside of the basket and down through the hole 24 in the bottom portion 15. The wire ends 30¹ and 29¹ are bent away from each other diagonally across the under-side of the basket and carried upwardly across the respective ends, thence across the ends and over and down on the inside faces of the end flaps 22 and 23 to have these wire ends compressibly retain these flaps in position against the basket ends. As indicated in Fig. 2, the handle ends of the one side cross the wires of the other side and form a very effective reenforcing support to the fiber board bottom of the basket, the weight on the basket bottom causing the ends of the respective wires to pull downwardly on the upper edges of the basket ends and thereby more firmly retaining the end flaps in position against the basket ends. With this method of attaching the handle ends, there is no need for staples or the like to secure these flaps to the basket ends to retain the basket in shape.

Where the basket is to have a cover 31 applied thereto, this cover 31 would normally be made of fiber board either in a solid form or in the corrugated form and would be retained in position by inward bends 32 and 33, Fig. 1, carried inwardly with some pressure over the top of the cover 31 for a short distance. The wires 29 and 30 of the handle 28 may be readily shaped to give the form as shown in Figs. 1 and 2 by a suitable pair of pliers without the necessity of having to employ special form machinery. Since the handle is supplied in the straight form as indicated in Fig. 9 and the basket proper is initially in the flat form as indicated by the blank in Fig. 8, the basket may be shipped in the knocked-down condition with the greatest saving of space.

Where it is not essential to reenforce the floor of the basket, a handle 28 shorter in length than that shown in Fig. 9 may be employed to have the terminal ends of the respective wires 29 and 30 bent around outwardly from the under side of the basket and thence upwardly in compressive contact with the sides 16 and 17 of the basket. It is understood that the handle 28 is carried through the holes of the basket in the same manner as that described and referred to in the form shown in Fig. 1 wherein the handle ends are inserted from the outside through holes through the basket sides and then carried downwardly within the basket to extend outwardly through holes in the basket floor. It is to be noted that the holes in the basket floor are sufficiently close to the fold line between the sides and the bottom of the basket that the slight portion of the handle which is exposed interiorly of the basket does not extend therein a sufficient distance to cause any damage to the contents. One particular use of the basket herein described is for the transportation of tomatoes and hence it is highly desirable that the interior of the basket be as smooth as possible and free from projections. Where the form of handle 28 is used as indicated in Fig. 3, the respective flaps overlapping the basket ends are stapled thereto as in the practice heretofore had.

A further modification from that shown in Fig. 3 is indicated in Fig. 4 wherein the handle 28 has the wire 30 extending a greater length on each end than does the wire 29. In this case, the wire 29 is bent around sharply from the hole 25 and carried upwardly along the side 17 in the same manner as it is in the form shown in Fig. 3. However, the longer wire 30 is bent sharply to extend across the under side of the basket floor 15 and is then carried up on the opposite side to have its end hooked over the top edge of that side. The other wire ends are similarly formed after coming through the hole 24.

In Fig. 5, the ends of the wires 29 and 30 instead of terminating at a slight distance above the lower corner of the sides of the basket are of sufficient length to extend entirely to the upper edge of the sides and to have at least one wire, here shown as the wire 30 bent over the top edge and down on the inside while the other wire is carried over the top of the cover 31 as a means of retaining it in position.

The invention is not necessarily limited to the use of two wires in the handle but may have other wires added thereto as for example, Fig. 6, where the handle is formed of three wires twisted together, the ends of two of which are formed about the basket exactly in the same manner as indicated in Figs. 1 and 2, while the third wire is of shorter length to have its free ends 34 and 35 carried outwardly and upwardly along the outer sides of the basket to either have the terminal ends thereof hooked over the top basket edges or as indicated in Fig. 6, turned inwardly as means for retaining the cover 31 in position.

As indicated in Fig. 10, the handle does not necessarily have to have its respective wires twisted one around the other but may have the wires held in separate relation. In the particular form of the handle as shown in Fig. 10, the wires 29 and 30 are maintained in parallel spaced relation by placing them within the corrugations of a narrow width of fiber board 36. In this form the length of the corrugated board is made to be such that when the handle is formed over the basket, the ends of the fiber board in the handle will terminate at or about the side holes 26 and 27 so that the ends of the wires 29 and 30 may be manipulated to produce any of the forms above described of handle attachment, as indicated in Fig. 11.

While I have herein shown and described my invention in the forms as now best known to me, it is obvious that other forms and variations may be employed without departing from the spirit of the invention and I therefore do not desire to be limited to those precise forms beyond the limitations as may be imposed by the following claims.

I claim:

1. In combination with a container, a handle having terminal bendable portions carried downwardly against the outer sides of opposite container walls nearly to the bottom and thence inserted from the outside of and through the opposite container walls and carried downwardly through the container bottom adjacent said walls, said bendable portions being bent under said bottom to extend therefrom around and up on the outer sides of the container.

2. In combination with a container, having a bottom, side and end walls formed out of a single piece, a handle having terminal bendable portions carried downwardly against the outer sides of opposite container walls nearly to the bottom and thence inserted from the outside of and through opposite of said walls and carried downwardly through said bottom adjacent said walls, said bendable portions being bent under said bottom to extend therefrom around and up on at least two of said walls, said handle being initially straight and comprising at least two wires, the handle being shaped and retained in shape by engagement of said terminal portions with said walls and bottom.

3. In combination with a container, having a bottom, side and end walls formed out of a single piece, a handle having terminal bendable portions carried downwardly against the outer sides of opposite container walls nearly to the bottom and thence inserted from the outside of and through opposite of said walls and carried downwardly through said bottom adjacent said walls, said bendable portions being bent under said bottom to extend therefrom around and up on at least two of said walls, said terminal portions being carried upwardly in compressive contact with and on the outer sides of said opposite walls and terminating a short distance above the bottom.

4. In combination with a container, having a bottom, side and end walls formed out of a single piece, a handle having terminal bendable portions carried downwardly against the outer sides of opposite container walls nearly to the bottom and thence inserted from the outside of and through opposite of said walls and carried downwardly through said bottom adjacent said walls, said bendable portions being bent under said bottom to extend therefrom around and up on at least two of said walls, said terminal portions being carried over the top edges of said walls.

5. In combination with a container, having a bottom, side and end walls, a handle having terminal bendable portions inserted from the outside of and through opposite of said walls and carried downwardly through said bottom adjacent said walls, said bendable portions being bent under said bottom to extend therefrom around and up on at least two of said walls, said terminal portions comprising two wires which extend diagonally and divergingly across under said bottom toward said two walls, said two walls being opposite end walls.

6. In combination with a container, having a bottom, side and end walls, a handle having terminal bendable portions inserted from the outside of and through opposite of said walls and carried downwardly through said bottom adjacent said walls, said bendable portions being bent under said bottom to extend therefrom around and up on at least two of said walls, said container end walls each consisting of a turned-up bottom portion and inturned side wall flaps, and said bendable portions being turned over the top edges of said end walls to grip compressively said flaps and bottom portion of the container one against the other.

7. In combination with a container, having a bottom, side and end walls, a handle having terminal bendable portions inserted from the outside of and through opposite of said walls and carried downwardly through said bottom adjacent said walls, said bendable portions being bent under said bottom to extend therefrom around and up on at least two of said walls, said terminal portions comprising separate wires, a wire of each portion inserted through one of said two walls being carried transversely across under the container bottom to the opposite of said two walls.

8. In combination with a container, having a bottom, side and end walls, a handle having terminal bendable portions inserted from the outside of and through opposite of said walls and carried downwardly through said bottom adjacent said walls, said bendable portions being bent under said bottom to extend therefrom around and up on at least two of said walls, and said bendable portions being carried over the top edges of said two walls.

9. In combination with a container, having a bottom, side and end walls, a handle having terminal bendable portions inserted from the outside of and through opposite of said walls and carried downwardly through said bottom adjacent said walls, said handle terminal bendable portions being bent under said bottom to extend therefrom around and up on at least two of said walls, said terminal portions being carried over the top edges of the walls through which the handle terminal portions were inserted, a cover for the container, said bendable portions consisting each of at least two separate wires, one of said wires being bent downwardly onto the inside of one of said two walls, and the other wire of that terminal portion being bent over onto said cover.

10. In combination with a container, having a bottom, side and end walls, a handle having terminal bendable portions inserted from the outside of and through opposite of said walls and carried downwardly through said bottom adjacent said walls, said bendable portions being bent under said bottom to extend therefrom around and up on at least two of said walls, a cover over said container, and said handle receiving said cover therebetween compressively against the cover edge portions.

11. In combination with a container having a bottom, sides and ends foldable into shape from the original flat blank, said container having side wall portions lapping the ends, a handle inserted through said walls and said bottom of the container and having portions interengaging said lapped end portions to retain the container in formed condition.

12. In combination with a container having a bottom, sides and ends, foldable into shape from an original flat blank, said container having side wall portions lapping the ends, a handle inserted through said walls, and the bottom of the container and having portions interengaging said lapped end portions to retain the container in formed condition, said handle portions being carried over the top edges of said overlapping portions.

F. MERRILL TALBOT.